(12) United States Patent
Matsutani et al.

(10) Patent No.: US 10,173,242 B2
(45) Date of Patent: Jan. 8, 2019

(54) METHOD OF MANUFACTURING AROMATIC POLYKETONE FILM, AROMATIC POLYKETONE FILM, SUBSTRATE PROVIDED WITH AROMATIC POLYKETONE FILM, OPTICAL ELEMENT, AND IMAGE DISPLAY DEVICE

(71) Applicant: HITACHI CHEMICAL COMPANY, LTD., Tokyo (JP)

(72) Inventors: Hiroshi Matsutani, Tokyo (JP); Nanako Mizuguchi, Tokyo (JP); Katsuya Maeyama, Yonezawa (JP)

(73) Assignee: HITACHI CHEMICAL COMPANY, LTD., Tokyo (JP)

(*) Notice: Subject to any disclaimer, the term of this patent is extended or adjusted under 35 U.S.C. 154(b) by 0 days.

(21) Appl. No.: 15/324,935

(22) PCT Filed: Jul. 2, 2015

(86) PCT No.: PCT/JP2015/069191
§ 371 (c)(1),
(2) Date: Jan. 9, 2017

(87) PCT Pub. No.: WO2016/006537
PCT Pub. Date: Jan. 14, 2016

(65) Prior Publication Data
US 2017/0203329 A1    Jul. 20, 2017

(30) Foreign Application Priority Data
Jul. 10, 2014 (JP) ................................. 2014-142469

(51) Int. Cl.
*B05D 3/02* (2006.01)
*B05D 7/24* (2006.01)
(Continued)

(52) U.S. Cl.
CPC ................ *B05D 3/02* (2013.01); *B05D 7/24* (2013.01); *C08G 67/00* (2013.01); *C09D 165/00* (2013.01)

(58) Field of Classification Search
CPC . B05D 3/02; B05D 7/24; C08G 67/00; C09D 165/00
(Continued)

(56) References Cited

FOREIGN PATENT DOCUMENTS

| JP | H05-239204 A | 9/1993 |
|----|---|---|
| JP | 2004-91723 A | 3/2004 |

(Continued)

OTHER PUBLICATIONS

International Search Report for PCT/JP2015/069191 dated Oct. 6, 2015; English translation submitted herewith (5 pages).
(Continued)

*Primary Examiner* — Alexander M Weddle
(74) *Attorney, Agent, or Firm* — Fitch, Even, Tabin & Flannery, L.L.P.

(57) ABSTRACT

Provided is a method of manufacturing an aromatic polyketone film, the method including: applying a coating liquid to at least a part of a surface of a substrate to form a coating liquid layer, the coating liquid including a solvent and an aromatic polyketone having a structural unit represented by Formula (1) or (2); drying the coating liquid layer; and after the drying, subjecting the coating liquid layer to a heat treatment. In Formula (1) or (2), each $R^1$ independently represents an alkyl group having 1 to 20 carbon atoms; each $R^2$ and each $R^3$ independently represents a hydrogen atom or an alkyl group having 1 to 20 carbon atoms; X represents a specific divalent aromatic hydrocarbon group, or a divalent alicyclic hydrocarbon group having 3 to 30 carbon atoms; and Y represents a specific divalent functional group.

(Continued)

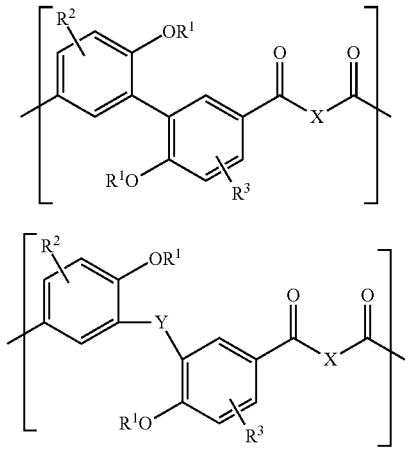

8 Claims, 1 Drawing Sheet

(51) Int. Cl.
*C08G 67/00* (2006.01)
*C09D 165/00* (2006.01)

(58) Field of Classification Search
USPC .................................. 427/372.2, 384, 385.5
See application file for complete search history.

(56) References Cited

FOREIGN PATENT DOCUMENTS

| JP | 2005-272728 A | | 10/2005 |
|---|---|---|---|
| JP | 2012-031345 A | | 2/2012 |
| JP | 2013-53194 A | | 3/2013 |
| JP | 2013053194 A | * | 3/2013 |
| JP | 2013-156652 A | | 8/2013 |

OTHER PUBLICATIONS

Written Opinion of the International Searching Authority dated Oct. 6, 2015 (3 pages).
English translation of abstract of "Latest Polyimides: Basics and Applications" (2002) edited by Japan Polyimide & Aromatic Polymers Research Group (7 pages).
English translation of abstract of "Future Materials", 2008, vol. 8, No. 8, p. 42-47 (10 pages).
Okamoto, et al., "Electrophilic Aromatic Substitution Acyl Polycondensation by Acyl-acceptor and Acyl-donor having Binaphthylylene Unit or Biphenylylene Unit", Kobunshi Ronbunshu, vol. 66, No. 4, pp. 147-153 (Apr. 2009) with excerpt translation; cited in office action in counterpart Taiwanese application.

\* cited by examiner

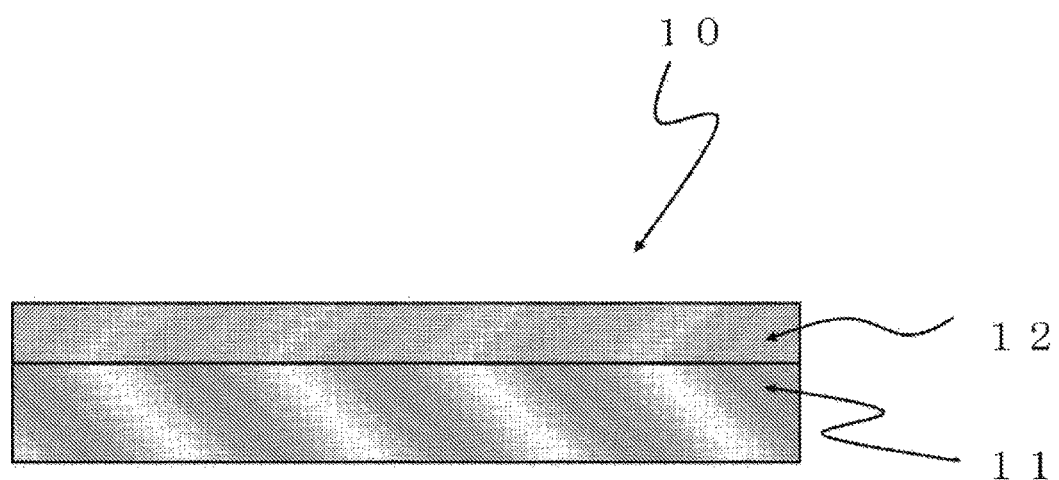

METHOD OF MANUFACTURING AROMATIC POLYKETONE FILM, AROMATIC POLYKETONE FILM, SUBSTRATE PROVIDED WITH AROMATIC POLYKETONE FILM, OPTICAL ELEMENT, AND IMAGE DISPLAY DEVICE

CROSS-REFERENCE TO RELATED APPLICATIONS

This application is a U.S. national phase application filed under 35 U.S.C. § 371 of International Application No. PCT/JP2015/069191, filed Jul. 2, 2015, designating the United States, which claims priority from Japanese Patent Application No. 2014-142469, filed Jul. 10, 2014, which are hereby incorporated herein by reference in their entirety.

TECHNICAL FIELD

The present disclosure relates to a method of manufacturing an aromatic polyketone film, an aromatic polyketone film obtained by the method of manufacturing an aromatic polyketone film, a substrate provided with an aromatic polyketone film having the aromatic polyketone film, as well as an optical element and an image display device having the substrate.

BACKGROUND ART

Aromatic polyimides have excellent heat resistance and mechanical properties, and are drawing attention as engineering plastics (see, for example, "Latest Polyimides: Basics and Applications" (2002) edited by Japan Polyimide & Aromatic Polymers Research Group). On the other hand, aromatic polyketones containing a carbonyl group in a main chain, such as aromatic polyimides, have excellent heat resistance and chemical resistance, and are also drawing attention as engineering plastics (see, for example, Japanese Patent Application Laid-Open (JP-A) No. 2005-272728 and "Future Materials", 2008, vol. 8, No. 8, page 42 to 47). Further, it is known that an aromatic polyketone having heat resistance and transparency can be obtained by introducing an alicyclic structure into an aromatic polyketone (see JP-A No. 2013-53194).

Demand for portable image display devices (mobile display devices), typified by mobile phones, is increasing in recent years, and lighter weight and improved reliability are required for optical elements included in the image display devices and the like. In response to such a demand, application of a polymer material (glass substitute material) and a surface protective layer (hard coat), which are capable of substituting glass and which have high transparency and are light weight, has been proposed (see, for example, JP-A No. 2013-156652).

SUMMARY OF THE INVENTION

Technical Problem

JP-A No. 2005-272728 discloses a cast film made of an aromatic polyketone, which is used as a separator for an electric double layer capacitor, after immersing the film in water and then heating the film at 60° C. for drying. Since this film is microporous and thus has low strength, it is difficult to use the film as a hard coat.

The aromatic polyketone disclosed in JP-A No. 2013-53194 is transparent, and accordingly, application thereof as a hard coat can be expected. However, the relationship between film forming conditions and strength of a film made of the aromatic polyketone is not clearly disclosed.

The present invention has been made in view of such circumstances, and aims to provide: a method of manufacturing an aromatic polyketone film having improved strength, and excellent transparency and heat resistance; an aromatic polyketone film obtained by the method of manufacturing an aromatic polyketone film; a substrate provided with an aromatic polyketone film having the aromatic polyketone film; as well as an optical element and an image processing device having the substrate.

Solution to Problem

The invention approaches the above mentioned problems, and includes the following aspects.

<1> A method of manufacturing an aromatic polyketone film, the method comprising:

applying a coating liquid to at least a part of a surface of a substrate to form a coating liquid layer, the coating liquid comprising a solvent and an aromatic polyketone having a structural unit represented by the following Formula (1) or Formula (2);

drying the coating liquid layer; and after the drying, subjecting the coating liquid layer to a heat treatment:

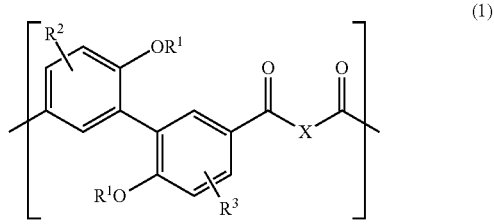

(1)

wherein, in Formula (1), each $R^1$ independently represents an alkyl group having 1 to 20 carbon atoms; each $R^2$ and each $R^3$ independently represents a hydrogen atom or an alkyl group having 1 to 20 carbon atoms; and X represents at least one selected from the group consisting of a divalent alicyclic hydrocarbon group having 3 to 30 carbon atoms and a divalent aromatic hydrocarbon group represented by the following Formula (1'):

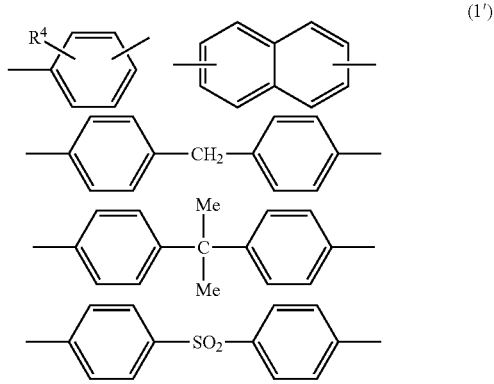

(1')

-continued

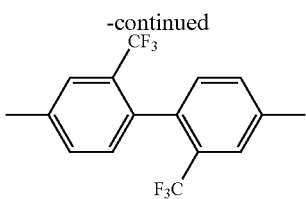

wherein, in Formula (1'), R⁴ represents a hydrogen atom, a fluorine atom, a chlorine atom, a bromine atom, an alkyl group having 1 to 20 carbon atoms, or a fluoroalkyl group having 1 to 20 carbon atoms;

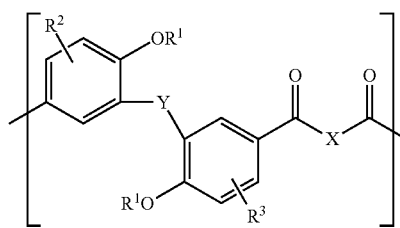

wherein, in Formula (2), the definitions of R¹, R², R³ and X are the same as the definitions of R¹, R², R³ and X in Formula (1), respectively; and Y represents at least one selected from divalent functional groups represented by the following Formula (2'):

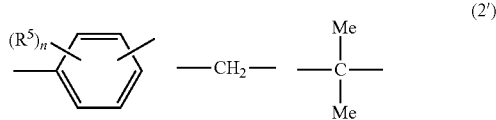

wherein, in Formula (2'), R⁵ represents an alkyl group having 1 to 20 carbon atoms or an alkoxy group having 1 to 20 carbon atoms; n represents an integer from 0 to 4; and, in a case in which n represents an integer from 2 to 4, a plurality of R⁵s may be the same as or different from each other.

<2> The method of manufacturing an aromatic polyketone film according to <1>, wherein the heat treatment is carried out at a temperature of 100° C. or higher.

<3> The method of manufacturing an aromatic polyketone film according to <1> or <2>, wherein, in Formula (1) or Formula (2), X comprises a divalent alicyclic hydrocarbon group having 3 to 30 carbon atoms.

<4> An aromatic polyketone film obtained by the method of manufacturing an aromatic polyketone film according to any one of <1> to <3>.

<5> The aromatic polyketone film according to <4>, wherein the aromatic polyketone film has an elastic modulus, as measured by a nanoindentation method, of from 5.0 GPa to 15 GPa, and a hardness, as measured by a nanoindentation method, of from 0.35 GPa to 1.0 GPa.

<6> A substrate provided with an aromatic polyketone film, comprising:
 a substrate; and
 the aromatic polyketone film according to <4> or <5> provided on at least a part of the surface of the substrate.

<7> An optical element, comprising the substrate provided with an aromatic polyketone film according to <6>.

<8> An image display device, comprising the substrate provided with an aromatic polyketone film according to <6>.

Advantageous Effects of Invention

According to the invention, it is possible to provide: a method of manufacturing an aromatic polyketone film having improved strength, and excellent transparency and heat resistance; an aromatic polyketone film obtained by the method of manufacturing an aromatic polyketone film; a substrate provided with an aromatic polyketone film having the aromatic polyketone film; as well as an optical element and an image processing device having the substrate.

BRIEF DESCRIPTION OF DRAWING

FIG. 1 is a schematic sectional view showing an example of a substrate provided with an aromatic polyketone film according to the disclosure.

DESCRIPTION OF EMBODIMENTS

The invention will now be described in detail below. However, the invention is in no way limited by the following embodiments.

In the present specification, any numerical range indicated using an expression "from * to" represents a range in which numerical values described before and after the "to" are included in the range as the minimum value and the maximum value thereof, respectively.

In the present specification, when a plurality of substances which correspond to each component in a composition are present therein, the amount of each component in the composition means, unless otherwise specified, the total amount of the plurality of substances present in the composition.

In the present specification, terms "layer" and "film" each encompasses a configuration thereof formed over an entire surface, as well as a configuration thereof formed in a part, when observed in a plan view.

Further, in the present specification, the term "step" includes not only an independent step, but also a step which is not clearly distinguishable from another step(s), as long as a desired action of the step can be achieved.

[Method of Manufacturing Aromatic Polyketone Film]

The method of manufacturing an aromatic polyketone film according to the disclosure will now be described in detail below.

The method of manufacturing an aromatic polyketone film according to the disclosure includes: applying a coating liquid to at least a part of a surface of a substrate to form a coating liquid layer (hereinafter also referred to as "coating liquid application step"), the coating liquid including a solvent and an aromatic polyketone having a structural unit represented by the following Formula (1) or Formula (2) (hereinafter also referred to as "specific aromatic polyketone"); drying the coating liquid layer (hereinafter also referred to as "drying step"); and after the drying step, subjecting the coating liquid layer to a heat treatment (hereinafter also referred to as "heat treatment step"):

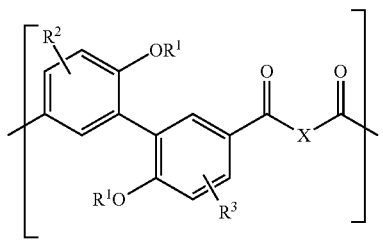

(1)

wherein, in Formula (1), each $R^1$ independently represents an alkyl group having 1 to 20 carbon atoms; each $R^2$ and each $R^3$ independently represents a hydrogen atom or an alkyl group having 1 to 20 carbon atoms; and X represents at least one selected from the group consisting of a divalent alicyclic hydrocarbon group having 3 to 30 carbon atoms and a divalent aromatic hydrocarbon group represented by the following Formula (1'):

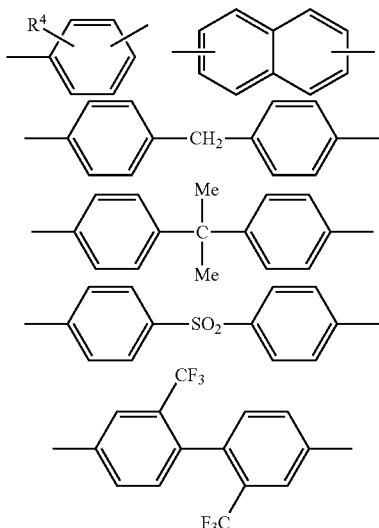

(1')

wherein, in Formula (1'), $R^4$ represents a hydrogen atom, a fluorine atom, a chlorine atom, a bromine atom, an alkyl group having 1 to 20 carbon atoms, or a fluoroalkyl group having 1 to 20 carbon atoms;

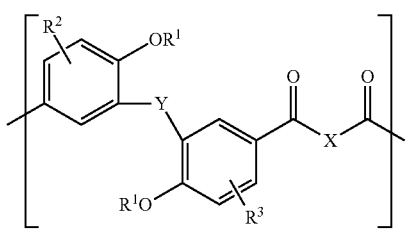

(2)

wherein, in Formula (2), the definitions of $R^1$, $R^2$, $R^3$ and X are the same as the definitions of $R^1$, $R^2$, $R^3$ and X in Formula (1), respectively; and Y represents at least one selected from divalent functional groups represented by the following Formula (2'):

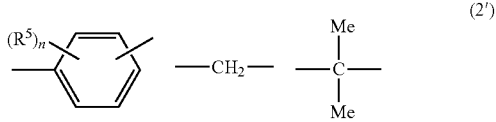

(2')

wherein, in Formula (2'), $R^5$ represents an alkyl group having 1 to 20 carbon atoms or an alkoxy group having 1 to 20 carbon atoms; n represents an integer from 0 to 4; and, in a case in which n represents an integer from 2 to 4, a plurality of $R^5$s may be the same as or different from each other.

By adopting the above-mentioned constitution, the method of manufacturing an aromatic polyketone film according to the disclosure is capable of producing an aromatic polyketone film having an improved strength, and excellent transparency and heat resistance.

The reason for this is not clear; however, it is assumed to be as follows.

In the disclosure, it is assumed that, by subjecting a coating liquid layer formed from a coating liquid containing a solvent and the specific aromatic polyketone which is a thermoplastic resin, to a heat treatment, volatilization of the solvent remaining in the coating liquid layer is accelerated, which in turn facilitates a reorientation of molecules of the specific aromatic polyketone during the heat treatment, thereby forming an aromatic polyketone film having an increased density. Further, one of the causes is thought to be that crosslinking, molecular chain elongation reactions and/or the like are initiated between the molecules of the specific aromatic polyketone due to the heat treatment, thereby increasing a molecular weight.

<Coating Liquid Application Step>

In the coating liquid application step, a coating liquid containing the specific aromatic polyketone and a solvent is applied to at least a part of the surface of a substrate, to form a coating liquid layer.

The method of applying the coating liquid is not particularly limited, as long as the method allows formation of a coating liquid layer on an arbitrary location on the substrate in an arbitrary shape. Examples of suitable method of applying the coating liquid include an immersion method, a spray method, a screen printing method, and a spin coating method.

(Coating Liquid)

Next, the coating liquid to be used in the disclosure will be described.

The coating liquid includes a specific aromatic polyketone and a solvent.

For example, the coating liquid may be obtained by dissolving the specific aromatic polyketone in a solvent. The method of dissolving the specific aromatic polyketone in a solvent is not particularly limited, and any method known in the technical field may be used. Further, an insoluble component(s) may be filtered out after dissolving the specific aromatic polyketone in a solvent, if necessary, to be used as the coating liquid according to the disclosure.

—Specific Aromatic Polyketone—

The specific aromatic polyketone is not particularly limited, as long as the specific aromatic polyketone contains a structural unit represented by the following Formula (1) or the following Formula (2).

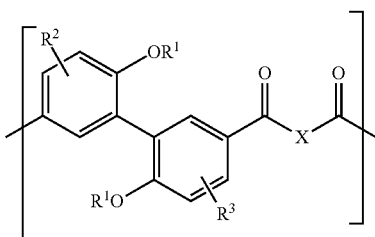
(1)

In Formula (1), each $R^1$ independently represents an alkyl group having 1 to 20 carbon atoms. Examples of the alkyl group include methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group; and structural isomers thereof. Of these, each $R^1$ preferably independently represents a methyl group, an ethyl group, an n-propyl group, an isopropyl group, an n-butyl group, an isobutyl group, a sec-butyl group, or a tert-butyl group, from the viewpoint of balancing a solubility in the solvent to be described later and the heat resistance.

In Formula (1), each $R^2$ and each $R^3$ independently represents a hydrogen atom or an alkyl group having 1 to 20 carbon atoms. Examples of the alkyl group having 1 to 20 carbon atoms represented by $R^2$ or $R^3$ include the alkyl groups having 1 to 20 carbon atoms represented by $R^1$ in Formula (1). Of these, each $R^2$ and each $R^3$ is preferably a hydrogen atom from the viewpoint of heat resistance. Each $R^2$ and each $R^3$ preferably independently represents a methyl group, an ethyl group, an n-propyl group, an isopropyl group, an n-butyl group, an isobutyl group, a sec-butyl group, or a tert-butyl group, from the viewpoint of balancing the solubility in the solvent to be described later and the heat resistance.

In Formula (1), X represents a divalent hydrocarbon group. Specifically, X represents at least one selected from the group consisting of a divalent aromatic hydrocarbon group and a divalent alicyclic hydrocarbon group.

Examples of the divalent aromatic hydrocarbon group include groups represented by the following Formula (1').

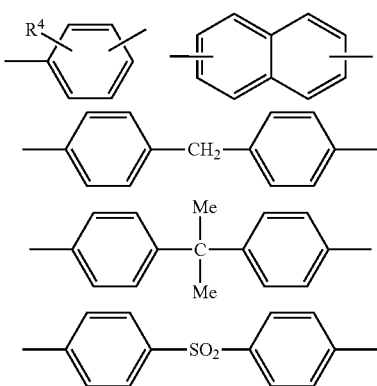
(1')

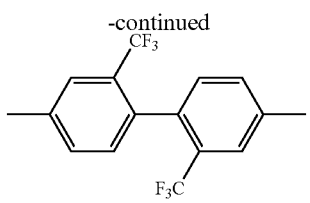

In Formula (1'), $R^4$ represents a hydrogen atom, a fluorine atom, a chlorine atom, a bromine atom, an alkyl group having 1 to 20 carbon atoms, or a fluoroalkyl group having 1 to 20 carbon atoms. Examples of the alkyl group having 1 to 20 carbon atom represented by $R^4$ include the alkyl groups having 1 to 20 carbon atoms represented by $R^1$ in Formula (1). Of these, $R^4$ is preferably a hydrogen atom from the viewpoint of heat resistance. $R^4$ preferably represents a methyl group, an ethyl group, an n-propyl group, an isopropyl group, an n-butyl group, an isobutyl group, a sec-butyl group, or a tert-butyl group, from the viewpoint of balancing the solubility in the solvent to be described later and the heat resistance. In Formula (1'), each Me independently represents a methyl group.

Among the divalent aromatic hydrocarbon groups represented by the Formula (1'), the aromatic hydrocarbon groups represented by the following Formula (3), which do not include a hetero atom in the main chain thereof are preferred, from the viewpoint of excellent heat resistance and chemical resistance:

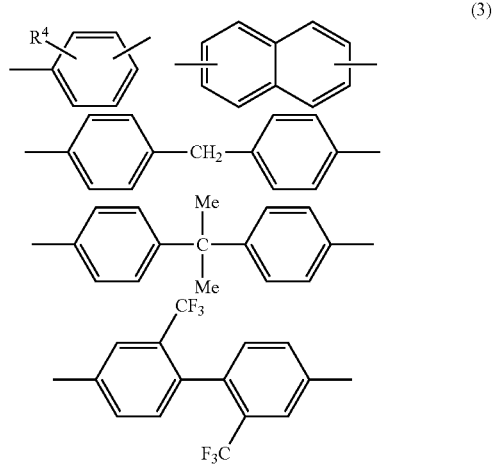
(3)

wherein in Formula (3), $R^4$ represents a hydrogen atom, a fluorine atom, a chlorine atom, a bromine atom, an alkyl group having 1 to 20 carbon atoms, or a fluoroalkyl group having 1 to 20 carbon atoms.

In the disclosure, X preferably represents a divalent alicyclic hydrocarbon group, from the viewpoint of transparency. The divalent alicyclic hydrocarbon group is preferably a divalent alicyclic hydrocarbon group having 3 to 30 carbon atoms, from the viewpoint of balancing the transparency and the strength of the resulting aromatic polyketone film, as well as the solubility in the solvent to be described later and the heat resistance. Examples of the divalent alicyclic hydrocarbon group having 3 to 30 carbon atoms include cyclopropanediyl group, cyclobutanediyl group, cyclopentanediyl group, cyclohexanediyl group, norbornanediyl group, norbornenediyl group, bicyclo[2.2.2]

octanediyl group, adamantanediyl group, spiro[3.3]heptanediyl group and decalindiyl group. Of these, an adamantanediyl group is more preferred, from the viewpoint of balancing the solubility in a solvent and the heat resistance at a higher level.

A structural unit represented by Formula (2) is shown below.

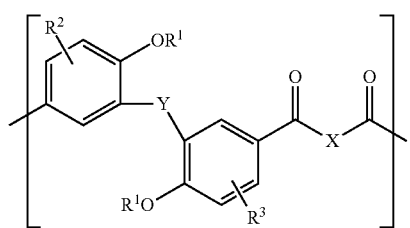

(2)

In Formula (2), the definitions of $R^1$, $R^2$, $R^3$ and X are the same as the definitions of $R^1$, $R^2$, $R^3$ and X in Formula (1), respectively, and preferred embodiments thereof are also the same.

In Formula (2), Y represents at least one selected from the divalent functional groups represented by the following Formula (2').

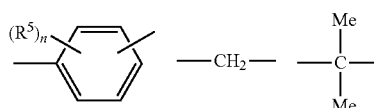

(2')

In Formula (2'), $R^5$ represents an alkyl group having 1 to 20 carbon atoms or an alkoxy group having 1 to 20 carbon atoms.

Examples of the alkyl group having 1 to 20 carbon atoms represented by $R^5$ include methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group; and structural isomers thereof. Of these, $R^5$ preferably represents a methyl group, an ethyl group, an n-propyl group, an isopropyl group, an n-butyl group, an isobutyl group, a sec-butyl group, or a tert-butyl group, from the viewpoint of balancing the solubility in the solvent to be described later and the heat resistance.

Examples of the alkoxy group having 1 to 20 carbon atoms represented by $R^5$ include methoxy group, ethoxy group, propoxy group, butoxy group, pentyloxy group, hexyloxy group, heptyloxy group, octyloxy group, nonyloxy group, decyloxy group, undecyloxy group, dodecyloxy group, tridecyloxy group, tetradecyloxy group, pentadecyloxy group, hexadecyloxy group, heptadecyloxy group, octadecyloxy group, nonadecyloxy group, and icosyloxy group; and structural isomers thereof. Of these, $R^5$ preferably represents a methoxy group, an ethoxy group, an n-propyloxy group, an isopropyloxy group, an n-butyloxy group, an isobutyloxy group, a sec-butyloxy group, or a tert-butyloxy group, from the viewpoint of balancing the solubility in the solvent to be described later and the heat resistance.

In Formula (2'), n represents an integer from 0 to 4. From the viewpoint of heat resistance, n preferably represents an integer from 0 to 2. In Formula (2'), each Me independently represents a methyl group.

The method of manufacturing the specific aromatic polyketone is not particularly limited, and any method known in the technical field may be used. For example, the specific aromatic polyketone may be manufactured by condensing a dicarboxylic acid represented by the following Formula (a) or a derivative thereof, with an aromatic compound represented by the following Formula (b) or Formula (c).

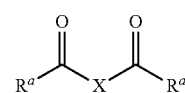

(a)

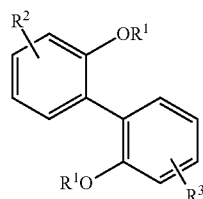

(b)

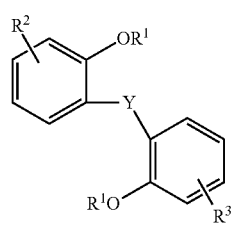

(c)

In Formula (a), each $R^a$ independently represents a hydroxyl group, a chlorine atom, or a bromine atom; and X has the same definition as X defined in the above-mentioned Formula (1).

In Formula (b) and Formula (c), the definitions of $R^1$, $R^2$, $R^3$ and Y are the same as the definitions of $R^1$, $R^2$, $R^3$ and Y in Formula (1) and Formula (2), respectively.

A feed ratio between the dicarboxylic acid or a derivative thereof and the aromatic compound, which are raw materials of the specific aromatic polyketone, is not particularly limited. The dicarboxylic acid or a derivative thereof and the aromatic compound may be fed, for example, in an equimolar ratio. However, one of the raw materials may be used in an excess amount within the range of from 0% by mole to 10% by mole, in view of controlling the molecular weight and the like.

The condensation reaction is preferably carried out in an acidic medium, as described in JP-A No. 2013-53194. Examples of the acidic medium include: (i) a mixture of diphosphorus pentaoxide with an organic sulfonic acid having a pKa of −3.0 or more (aqueous solution); (ii) an organic solvent solution of a perfluoroalkane sulfonic acid; (iii) a polyphosphoric acid, or a mixture of a polyphosphoric acid with an organic sulfonic acid having a pKa of −3.0 or more; and (iv) an organic solvent solution of aluminum trichloride.

In a case of the above-mentioned (i) or (iii), it is preferable to use a dicarboxylic acid as a raw material. In a case of the above-mentioned (ii) or (iv), it is preferable to use a dicarboxylic acid derivative (such as dicarboxylic acid chloride or alicyclic dicarboxylic acid bromide) as a raw material.

In a case of the above (i), an alkane sulfonic acid having 1 to 5 carbon atoms or the like may be used as the organic sulfonic acid. Of the alkane sulfonic acids having 1 to 5 carbon atoms, methane sulfonic acid is preferred. A mass ratio of diphosphorus pentaoxide and the organic sulfonic acid having a pKa of −3.0 or more (i.e., diphosphorus pentaoxide:organic sulfonic acid) is preferably from 1:3 to 1:30, and more preferably from 1:10 to 1:20, from the viewpoint of viscosity and a function as a condensing agent.

In a case of the above (ii), a perfluoroalkane sulfonic acid having 1 to 5 carbon atoms or the like may be used as the perfluoroalkane sulfonic acid. Of the perfluoroalkane sulfonic acids having 1 to 5 carbon atoms, trifluoromethane sulfonic acid is preferred.

As the organic solvent, an aprotic organic solvent may be used, for example. Examples of the aprotic organic solvent include halogenated hydrocarbons such as 1,2-dichloroethane, methylene chloride, or chloroform; nitrogen-containing organic solvents such as nitrobenzene, or nitromethane; and sulfur-containing organic solvents such as carbon disulfide, or dimethylsulfoxide. These organic solvents may be used singly, or in combination of a plurality of kinds thereof. Of the organic solvents, a halogenated hydrocarbon is preferred, and 1,2-dichloroethane or methylene chloride is more preferred.

In the above (iii), the polyphosphoric acid is represented by $H(HPO_3)_nOH$ (wherein n represents an integer of 2 or more). Examples of the polyphosphoric acid include pyrophosphoric acid, tripolyphosphoric acid, and tetrapolyphosphoric acid, and they may be used singly or in combination of a plurality of kinds thereof.

In the above (iv), any of the aprotic organic solvents as described above may be used as the organic solvent.

The condensation reaction may be carried out by introducing the dicarboxylic acid or a derivative thereof and the aromatic compound as the raw materials, and the acidic medium into a container, followed by heating while stirring.

The condensation reaction is allowed to proceed preferably at a reaction temperature of 0° C. or higher, for example. The reaction temperature is more preferably 10° C. or higher, particularly in a case in which an organic solvent solution of aluminum trichloride is used as the acidic medium. The reaction temperature is more preferably 20° C. or higher, in a case in which a mixture of diphosphorus pentaoxide with an organic sulfonic acid, or an organic solvent solution of a perfluoroalkane sulfonic acid is used as the acidic medium.

When a mixture of diphosphorus pentaoxide with an organic sulfonic acid, or an organic solvent solution of a perfluoroalkane sulfonic acid is used as the acidic medium, it is possible to allow a favorable condensation reaction to proceed even at a temperature of 70° C. or lower. When an organic solvent solution of aluminum trichloride is used as the acidic medium, it is possible to allow a favorable condensation reaction to proceed even at a temperature of 40° C. or lower.

A reaction time for allowing the condensation reaction to proceed is not particularly limited, and the reaction time may be, for example, from 2 hours to 100 hours. A pressure during the reaction is not particularly limited, and the reaction may be carried out, for example, at around normal pressure.

A content of the specific aromatic polyketone in a coating liquid in the disclosure is preferably from 1% by mass to 95% by mass, and more preferably from 5% by mass to 90% by mass.

—Solvent—

The solvent in the disclosure is not particularly limited as long as the solvent is capable of dissolving the specific aromatic polyketone, and any solvent used in the technical field may be used. Examples of the solvent include γ-butyrolactone, ethyl lactate, propylene glycol monomethyl ether acetate, butyl acetate, benzyl acetate, n-butyl acetate, ethoxyethyl propionate, 3-methylmethoxy propionate, N-methyl-2-pyrrolidone, N-cyclohexyl-2-pyrrolidone, N,N-dimethylformamide, N,N-dimethyl acetamide, dimethylsulfoxide, hexamethylphosphorylamide, tetramethylene sulfone, diethyl ketone, diisobutyl ketone, methyl amyl ketone, cyclohexanone, propylene glycol monomethyl ether, propylene glycol monopropyl ether, propylene glycol monobutyl ether, dipropylene glycol monomethyl ether, xylene, mesitylene, ethylbenzene, propylbenzene, cumene, diisopropylbenzene, hexylbenzene, anisole, diglyme, chloroform, dichloromethane, dichloroethane, and chlorobenzene. These solvents can be used singly, or in combination of a plurality of kinds thereof.

—Other Components—

The coating liquid in the disclosure may further contain an additive, in addition to the specific aromatic polyketone and the solvent. Examples of the additive include auxiliary adhesives, surfactants, leveling agents, antioxidants, and UV light deterioration inhibitors.

(Method of Manufacturing Coating Liquid)

The method of manufacturing the coating liquid in the disclosure is not particularly limited, and any method known in the technical field may be used. For example, the coating liquid may be manufactured by mixing and dissolving the specific aromatic polyketone, and other components, if necessary, in a solvent. After dissolving, the resultant may be filtered using a membrane filter or the like, before being used as a coating liquid.

(Substrate)

The substrate is not particularly limited, and examples thereof include substrates made of materials such as glasses, semiconductors, metal oxide insulators (such as titanium oxide or silicon oxide), silicon nitride, triacetyl cellulose, or transparent resins (such as transparent polyimides, polycarbonates, acrylic polymers, or cycloolefin resins). The shape of the substrate is not particularly limited, and the substrate may be in the shape of a plate or a film.

<Drying Step>

After applying (coating) a coating liquid to a substrate to form a coating liquid layer in the coating liquid application step, the coating liquid layer is dried in a drying step. The method of drying the coating liquid layer is not particularly limited. For example, the coating liquid layer may be dried by applying heat using a hot plate, an oven, or the like.

The drying is preferably carried out at a temperature of from 60° C. to 100° C., and more preferably from 80° C. to 100° C. The drying is preferably carried out for a period of time from 1 minute to 60 minutes.

<Heat Treatment Step>

After the drying step, the coating liquid layer is further subjected to a heat treatment in the heat treatment step, to thereby obtain an aromatic polyketone film.

The heat treatment is preferably carried out at a temperature of 100° C. or higher, more preferably from 100° C. to 300° C., still more preferably from 120° C. to 300° C., particularly preferably from 150° C. to 300° C., and extremely preferably from 200° C. to 300° C., from the viewpoint of the strength (for example, elastic modulus and hardness) of the resulting aromatic polyketone film.

The method for carrying out the heat treatment is not particularly limited. The heat treatment may be carried out, for example, using an oven such as a compartment dryer, a hot wind conveyor dryer, a quartz tube furnace, a hot plate, a rapid thermal annealer, a vertical diffusion furnace, an infrared curing oven, an electron beam curing oven, or a microwave curing oven.

Further, the heat treatment step may be carried out under conditions of air atmosphere, or an inert atmosphere such as a nitrogen atmosphere. The heat treatment is preferably carried out under a nitrogen atmosphere, from the viewpoint of preventing an oxidation of the specific aromatic polyketone. The heat treatment in the heat treatment step is carried out for a period of time sufficient for obtaining an aromatic polyketone film having a sufficient hardness. In view of the balance with an operational efficiency, the heat treatment is preferably carried out for a period of time from about 1 hour to about 5 hours.

[Aromatic Polyketone Film]

The aromatic polyketone film according to the disclosure is obtained by the method of manufacturing an aromatic polyketone film according to the disclosure. The aromatic polyketone film obtained by the method of manufacturing an aromatic polyketone film according to the disclosure tends to have an improved strength, and excellent transparency and heat resistance.

The aromatic polyketone film according to the disclosure preferably has an elastic modulus, as measured by a nanoindentation method, of from 5.0 G Pa to 15 GPa, and a hardness, as measured by a nanoindentation method, of from 0.35 GPa to 1.0 GPa, from the viewpoint of securing excellent strength of the aromatic polyketone film as well as excellent reliability of the resulting substrate, optical element and image display device. The aromatic polyketone film more preferably has an elastic modulus of from 6.0 GPa to 15 GPa, and a hardness of from 0.40 GPa to 1.0 GPa.

The nanoindentation method may be carried out using a commercially available nanoindenter, and by a known method. Measurements are carried out using a substrate having the above-mentioned aromatic polyketone film (i.e., substrate provided with an aromatic polyketone film).

For example, the elastic modulus and the hardness of an aromatic polyketone film included in the substrate provided with an aromatic polyketone film may be measured using a nanoindenter, NANO INDENTER SA2/DCM (manufactured by Agilent Technologies, Inc.), and using a triangular pyramid diamond as a terminal, under conditions of a measurement frequency of 60 MHz, an indentation depth of from 0 nm to 500 nm, and a measurement temperature of 23° C.

[Substrate Provided with Aromatic Polyketone Film, Optical Element and Image Display Device]

In the disclosure, it is possible to obtain a substrate provided with an aromatic polyketone film, including: a substrate; and an aromatic polyketone film which is obtained by the method of manufacturing an aromatic polyketone film according to the disclosure, and which is provided on at least a part of the surface of the substrate.

Further, in the disclosure, it is possible to obtain an optical element and an image display device including the substrate provided with an aromatic polyketone film.

The substrate provided with an aromatic polyketone film, the optical element, and the image display device, according to the disclosure, will now be described with reference to drawings. However, it should be noted that the invention is not limited by the following descriptions and the drawings.

For example, the substrate provided with an aromatic polyketone film according to the disclosure includes an aromatic polyketone film formed by the method of manufacturing an aromatic polyketone film according to the disclosure, on at least one face of the substrate made of a transparent resin or the like in the form of a film.

FIG. 1 is a schematic sectional view showing an example of the substrate provided with an aromatic polyketone film according to the disclosure. In order to facilitate understanding, FIG. 1 shows the size, ratio, and the like of each of the constitutional members which are different from those of an actual substrate provided with an aromatic polyketone film. As shown in FIG. 1, a substrate provided with an aromatic polyketone film 10 includes a transparent resin film 11; and an aromatic polyketone film 12 formed on one face of the transparent resin film 11. Note, however, that the invention is not limited to the embodiment.

The substrate provided with an aromatic polyketone film according to the disclosure may have, for example, a structure in which an aromatic polyketone film is formed on both faces of the transparent resin substrate in the form of a film.

The aromatic polyketone film 12 shown in the example shown in FIG. 1 is formed as a single layer. However, in a substrate provided with an aromatic polyketone film according to the disclosure, the aromatic polyketone film may be formed in a multilayer structure in which two or more layers are disposed one on another in layers. In this case, the multilayer structure is not particularly limited, as long as the aromatic polyketone film formed by the method of manufacturing an aromatic polyketone film according to the disclosure is disposed at the outermost surface of the substrate provided with aromatic polyketone films.

The optical element and the image display device according to the disclosure include the substrate provided with an aromatic polyketone film according to the disclosure.

For example, the optical element or the image display device according to the disclosure may be obtained, usually by pasting the substrate side of the transparent resin film or the like of the substrate provided with an aromatic polyketone film according to the disclosure to a member included in an LCD (liquid display), an ELD (electroluminescence display), or the like, through a tackifier, an adhesive, or the like.

Next, the optical element including a substrate provided with an aromatic polyketone film according to the disclosure will be described, taking a polarizing plate as an example. A polarizing plate which is an exemplary optical element according to the disclosure may be obtained, for example, by layering a substrate provided with an aromatic polyketone film according to the disclosure, with a polarizer or a polarizing plate using a tackifier, an adhesive, or the like.

The polarizer is not particularly limited, and any of various types of polarizers may be used. Further, the configuration of the polarizing plate having a substrate provided with an aromatic polyketone film according to the disclosure is not particularly limited.

The substrate provided with an aromatic polyketone film according to the disclosure, and various types of optical elements including the same, such as the polarizing plate, may be suitably used in various types of image display devices such as a liquid crystal display device. The image display device according to the disclosure may have the same configuration as a conventional image display device, except for having a substrate provided with an aromatic polyketone film according to the disclosure. In a case in which an image display device according to the disclosure is a liquid crystal display device, the liquid crystal display device may be obtained, for example, by assembling, as appropriate, respective structural members such as liquid crystal cells, optical elements such as a polarizing plate, and a lighting system (such as a backlight) if necessary, and incorporating a driving circuit, and the like. The liquid crystal cells are not particularly limited. As the liquid crystal cells, various types of cells such as TN (Twisted Nematic) cells, STN (Super Twisted Nematic) cells, and π cells, for example, may be used.

The image display device according to the disclosure is used for arbitrary, appropriate applications. Examples of the application include: OA (Office Automation) equipment such as desktop personal computers, notebook personal computers, or copying machines; portable devices such as mobile phones, watches, digital cameras, personal digital assistants (PDAs), or portable game consoles; home electric appliances such as video cameras, television sets, or microwave ovens; in-vehicle devices such as rear monitors, monitors for car navigation systems, or car audio systems; exhibition devices such as information monitors for commercial stores; security devices such as surveillance monitors; and nursing and medical equipment such as nursing monitors and medical monitors.

EXAMPLES

The present invention will now be described more specifically, with reference to Examples. However, the invention is not limited by these Examples, as long as the gist of the invention is not deviated. Note that, "part(s)" and "%" are on mass basis, unless otherwise specified.

Reference Synthesis Example 1: Synthesis of Aromatic Polyketone PK1

To a flask containing 0.66 g (4.0 mmol) of isophthalic acid and 0.86 g (4.0 mmol) of 2,2'-dimethoxybiphenyl, 12 ml of a mixed liquid of diphosphorus pentaoxide and methane sulfonic acid (mass ratio 1:10) was added, followed by stirring at 60° C. for 24 hours. After the reaction, the resulting mixed liquid was poured into distilled water, and precipitates thereby generated were collected by filtration. The thus-obtained solid was washed with distilled water and methanol, and then dried, thereby obtaining an aromatic polyketone PK1 (isolated yield: 90%).

Since the aromatic polyketone PK1 did not dissolve in tetrahydrofuran (THF) or in N,N-dimethylformamide (DMF), it was unable to measure the molecular weight of the aromatic polyketone PK1 by a GPC method using THF or DMF as a developing phase.

Reference Synthesis Example 2: Synthesis of Aromatic Polyketone PK2

Aromatic polyketone PK2 (isolated yield: 85%) was obtained in the same manner as in Reference Synthesis Example 1, except that 0.69 g (4.0 mmol) of cyclohexane-1,3-dicarboxylic acid was used instead of isophthalic acid.

The weight average molecular weight of aromatic polyketone PK2 as measured by the GPC method in terms of standard polystyrene was 30,000.

Reference Synthesis Example 3: Synthesis of Aromatic Polyketone PK3

Aromatic polyketone PK3 (isolated yield: 89%) was obtained in the same manner as in Reference Synthesis Example 1, except that 0.90 g (4.0 mmol) of adamantane-1,3-dicarboxylic acid was used instead of isophthalic acid.

The weight average molecular weight of the aromatic polyketone PK3 as measured by the GPC method in terms of standard polystyrene was 60,000.

Comparative Reference Synthesis Example 1: Synthesis of Polysiloxane PS

Into a solution obtained by dissolving 130 g of tetraethoxysilane and 65 g of methyltrimethoxysilane in 340 g of propylene glycol monopropyl ether (PGP), 66 g of water mixed with 0.92 g of 70% nitric acid was added by dropping over 30 minutes. After completion of the dropping, the resultant was allowed to react for 5 hours, thereby obtaining a PGP solution of a polysiloxane PS. The weight average molecular weight of polysiloxane PS, in terms of standard polystyrene as measured by the GPC method, was 7,000.

Comparative Reference Synthesis Example 2: Synthesis of Polyimide Precursor PI A quantity of 4.0 g of 4,4'-diaminodiphenyl ether was dissolved in 34 g of sufficiently dehydrated N,N-dimethylacetamide (DMAc). To the resulting solution, a mixture of 3.2 g of 4,4'-carbonylbis(benzene-1,2-dicarboxylic acid)1,2:1',2'-dianhydride and 2.2 g of benzene-1,2,4,5-tetracarboxylic acid 1,2:4,5-dianhydride was gradually added. Subsequently, the resulting solution was stirred at room temperature (25° C.) for 24 hours, thereby obtaining a DMAc solution of a polyamic acid (polyimide precursor) PI.

The weight average molecular weight of the polyimide precursor, in terms of standard polystyrene as measured by the GPC method, was 50,000.

Reference Examples 1 to 3: Preparation of Coating Liquids V1 to V3 Containing Aromatic Polyketone and Solvent Each of aromatic polyketones PK1 to PK3 obtained in Reference Synthesis Examples 1 to 3 was dissolved in each of the solvents shown in the following Table 1 to a concentration of 10% by mass. Then, the resultants were each filtered using a membrane filter made of polytetrafluoroethylene (pore size: 5 micrometer), thereby obtaining coating liquids V1 to V3 each containing an aromatic polyketone and a solvent.

TABLE 1

|  | Reference Example 1 | Reference Example 2 | Reference Example 3 |
|---|---|---|---|
| Coating liquid containing aromatic polyketone and solvent | V1 | V2 | V3 |
| Aromatic polyketone | PK1 | PK2 | PK3 |
| Solvent | 1,2-dichloroethane | A mixed liquid of N-methyl-2-pyrrolidone and 1,2-dichloroethane (mass ratio: 10:1) | N-methyl-2-pyrrolidone |

Comparative Reference Example 1: Preparation of Coating Liquid V4 Containing Polysiloxane and Solvent The PGP solution of polysiloxane PS obtained in Comparative Reference Synthesis Example 1 was filtered using a membrane filter made of polytetrafluoroethylene (pore size: 5 micrometer), thereby obtaining a coating liquid V4 containing a polysiloxane and a solvent.

Comparative Reference Example 2: Preparation of Coating Liquid V5 Containing Polyimide Precursor and Solvent The DMAc solution of polyimide precursor PI obtained in Comparative Reference Synthesis Example 2 was filtered using a membrane filter made of polytetrafluoroethylene (pore size: 5 micrometer), thereby obtaining a coating liquid V5 containing a polyimide precursor and a solvent.

Examples 1 to 4: Manufacture of Aromatic Polyketone Films and Substrates with Aromatic Polyketone Film Each of the coating liquids V1 to V3 obtained in Reference Examples 1 to 3 was coated on a silicon substrate and a glass substrate by a spin coating method, respectively. The thus-obtained substrates were dried on a hot plate controlled at the respective temperatures shown in the following Table 2 for 3 minutes. Further, the dried substrates were subjected to a heat treatment using an inert gas oven (manufactured by Koyo Thermo Systems Co., Ltd.) under a nitrogen gas stream, at the respective temperatures shown in Table 2 for 1 hour, thereby obtaining silicon substrates with an aromatic polyketone film, and glass substrates with an aromatic polyketone film.

Comparative Example 2: Manufacture of Polysiloxane Film and Substrates with Polysiloxane Film The coating liquid V4 obtained in Comparative Reference Example 1 was coated on a silicon substrate and a glass substrate by a spin coating method. The thus-obtained substrates were dried on a hot plate controlled at the temperature shown in Table 2 for 3 minutes. Further, the dried substrates were subjected to a heat treatment using an inert gas oven (manufactured by Koyo Thermo Systems Co., Ltd.) under a nitrogen gas stream, at the temperature shown in Table 2 for 1 hour, thereby obtaining a silicon substrate provided with a polysiloxane film and a glass substrate provided with a polysiloxane film.

Comparative Example 3: Manufacture of Polyimide Film and Substrates with Polyimide Film A silicon substrate provided with a polyimide film and a glass substrate provided with a polyimide film were obtained by subjecting the coating liquid V5 obtained in Comparative Reference Example 2 to coating by a spin coating method, drying, and heat treatment for 1 hour in the same manner as in Comparative Example 2.

(Measurement of Film Thickness)

The measurement of the film thickness of each of the aromatic polyketone films, the polysiloxane film, and the

TABLE 2

|  | Example 1 | Example 2 | Example 3 | Example 4 | Comparative Example 1 | Comparative Example 2 | Comparative Example 3 |
|---|---|---|---|---|---|---|---|
| Coating liquid | V1 | V2 | V3 | V3 | V3 | V4 | V5 |
| Aromatic polyketone and the like | PK1 | PK2 | PK3 | PK3 | PK3 | PS | PI |
| Drying temperature [° C.] | 95 | 95 | 95 | 95 | 95 | 95 | 95 |
| Heat treatment temperature [° C.] | 200 | 200 | 120 | 200 | No heat treatment | 300 | 300 |
| Film thickness [μm] | 2.2 | 1.8 | 2.0 | 1.9 | 2.1 | 1.1 | 2.4 |
| Elastic modulus [GPa] | 5.4 | 6.0 | 6.4 | 6.9 | 3.5 | 4.8 | 4.0 |
| Hardness [GPa] | 0.36 | 0.40 | 0.46 | 0.49 | 0.24 | 0.33 | 0.30 |
| Transmittance [%] | 81% | 93% | 98% or more | 98% or more | Data not available | 98% or more | 70% |
| Thermal decomposition Temperature [° C.] | 492 | 440 | 480 | 485 | Data not available | >500 | 500 |

Comparative Example 1: Manufacture of Aromatic Polyketone Film and Substrates with Aromatic Polyketone Film The coating liquid V3 obtained in Reference Example 3 was coated on a silicon substrate and a glass substrate by a spin coating method. The thus-obtained substrates were dried on a hot plate controlled at the temperature shown in Table 2 for 3 minutes. Unlike Example 3 and Example 4, the dried substrates with an aromatic polyketone film were used as a silicon substrate provided with an aromatic polyketone film and a glass substrate provided with an aromatic polyketone film, of Comparative Example 1, without being subjected to a heat treatment.

polyimide film was carried out, using the glass substrates with an aromatic polyketone film obtained in Examples 1 to 4 and Comparative Example 1, the glass substrate provided with a polysiloxane film obtained in Comparative Example 2, and the glass substrate provided with a polyimide film obtained in Comparative Example 3, and using a stylus step profiler, ALPHA-STEP D-120 (manufactured by KLA-Tencor Corporation). The results thereof are shown in Table 2.

(Measurement of Elastic Modulus and Hardness)

The measurement of the elastic modulus and hardness of each of the aromatic polyketone films, the polysiloxane film, and the polyimide film was carried out, using the silicon substrates with an aromatic polyketone film obtained in Examples 1 to 4 and Comparative Example 1, the silicon substrate provided with a polysiloxane film obtained in Comparative Example 2, and the silicon substrate provided with a polyimide film obtained in Comparative Example 3, and using a nanoindenter, NANO INDENTER SA2/DCM (manufactured by Agilent Technologies, Inc.). The measurement was carried out using a triangular pyramid diamond as the terminal, under conditions of a measurement frequency of 60 MHz, an indentation depth of from 0 nm to 500 nm, and a measurement temperature of 23° C. The results thereof are shown in Table 2.

(Measurement of Transmittance)

The transmittance of UV light at 400 nm of each of the glass substrates with an aromatic polyketone film obtained in Examples 1 to 4, the glass substrate provided with a polysiloxane film obtained in Comparative Example 2, and the glass substrate provided with a polyimide film obtained in Comparative Example 3, was measured by a UV visible absorption spectrum method, using a V-570 (manufactured by JASCO Corporation). The transmittance of each of the films of the substrates in terms of a film thickness of 1 obtained using the transmittance of the glass substrate provided without a film as a reference, is shown in Table 2.

(Measurement of Thermal Decomposition Temperature)

The coating liquids V1 to V3 obtained in Reference Examples 1 to 3 and the coating liquids V4 and V5 obtained in Comparative Reference Examples 1 and 2 were each dropped into an aluminum cup, followed by drying and heat treatment under the respective conditions shown in Table 2, to obtain solid resins. The thus-obtained resins were then removed from the aluminum cups, and the reduction in weight of each of the resins was measured using a thermogravimetric balance, TG-DTA 6300 (manufactured by Hitachi High-Tech Science Corporation (Hitachi High-Technologies Corporation)). The temperature at an intersection of a tangent line at a point where a weight change curve of the resin shows an abrupt decline due to heat, is defined as the thermal decomposition temperature. The thermal decomposition temperatures of the solid resins obtained from coating liquids V1 to V5 are shown in Table 2.

As can be seen from the results of Examples 1 to 4 shown in Table 2, the aromatic polyketone films obtained by the manufacturing method of the disclosure have high strength, such as an elastic modulus of 5.4 GPa or more and a hardness of 0.36 GPa or more, and excellent heat resistance, such as a thermal decomposition temperature of 440° C. or higher.

On the other hand, as can be seen from the results of Comparative Example 1, the aromatic polyketone film prepared without heat treatment has a low elastic modulus and hardness. Further, it can be seen that the aromatic polyketone films obtained by the manufacturing method of the disclosure have improved strength, as compared to the film obtained using a polysiloxane, which is a thermosetting resin having high heat resistance (Comparative Example 2), and the film obtained using a polyimide, which becomes insoluble during the heat treatment due to imidization reaction (Comparative Example 3).

In addition, the results of Examples 3 and 4 show that the aromatic polyketone films (Examples 3 and 4), obtained by the manufacturing method of the disclosure and using the aromatic polyketone (PK3 described in Reference Synthesis Example 3) containing an adamantanediyl group, have extremely high strength, such as an elastic modulus of 6.4 GPa or more and a hardness of 0.46 GPa or more, excellent heat resistance such as a thermal decomposition temperature of 480° C. or higher, as well as excellent transparency such, as a transmittance of 98% or more.

INDUSTRIAL APPLICABILITY

According to the invention, it is possible to obtain an aromatic polyketone film having an improved strength, and excellent transparency and heat resistance.

The disclosure of Japanese Patent Application No. 2014-142469 filed on Jul. 10, 2014 is incorporated herein by reference in their entirety.

All publications, patent applications, and technical standards mentioned in the present specification are incorporated herein by reference to the same extent as if such individual publication, patent application, or technical standard is specifically and individually indicated to be incorporated by reference.

What is claimed is:

1. A method of manufacturing an aromatic polyketone film, the method comprising:
applying a coating liquid to at least a part of a surface of a substrate to form a coating liquid layer, the coating liquid comprising a solvent and an aromatic polyketone having a structural unit represented by the following Formula (1) or the following Formula (2);
drying the coating liquid layer; and
after the drying, subjecting the coating liquid layer to a heat treatment:

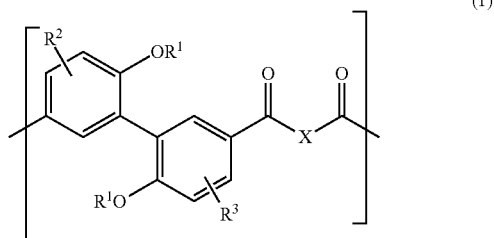

wherein, in Formula (1), each $R^1$ independently represents an alkyl group having 1 to 20 carbon atoms; each $R^2$ and each $R^3$ independently represents a hydrogen atom or an alkyl group having 1 to 20 carbon atoms; and X represents at least one selected from the group consisting of a divalent alicyclic hydrocarbon group having 3 to 30 carbon atoms and the following divalent aromatic hydrocarbon groups:

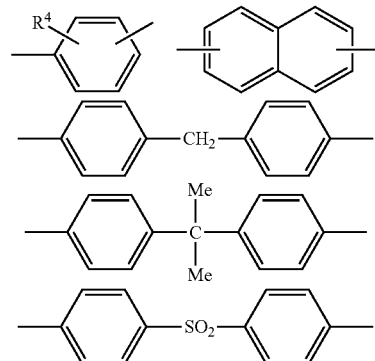

-continued

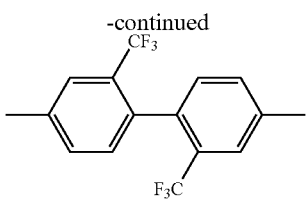

wherein R⁴ represents a hydrogen atom, a fluorine atom, a chlorine atom, a bromine atom, an alkyl group having 1 to 20 carbon atoms, or a fluoroalkyl group having 1 to 20 carbon atoms;

(2)

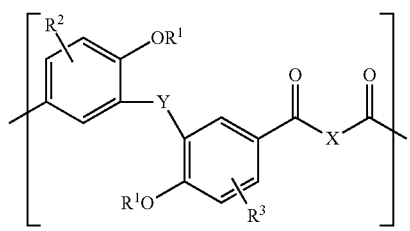

wherein, in Formula (2), the definitions of $R^1$, $R^2$, $R^3$ and X are the same as the definitions of $R^1$, $R^2$, $R^3$ and X in Formula (1), respectively; and Y represents at least one selected from the following divalent functional groups:

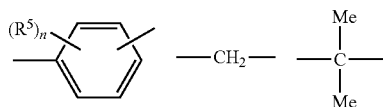

wherein $R^5$ represents an alkyl group having 1 to 20 carbon atoms or an alkoxy group having 1 to 20 carbon atoms; n represents an integer from 0 to 4; and, in a case in which n represents an integer from 2 to 4, a plurality of $R^5$s may be the same as or different from each other.

2. The method of manufacturing an aromatic polyketone film according to claim 1, wherein the heat treatment is carried out at a temperature of 100° C. or higher.

3. The method of manufacturing an aromatic polyketone film according to claim 1, wherein, in the Formula (1) or Formula (2), X represents a divalent alicyclic hydrocarbon group having 3 to 30 carbon atoms.

4. An aromatic polyketone film obtained by the method of manufacturing an aromatic polyketone film according to claim 1.

5. The aromatic polyketone film according to claim 4, wherein the aromatic polyketone film has an elastic modulus, as measured by a nanoindentation method, of from 5.0 GPa to 15 GPa, and a hardness, as measured by a nanoindentation method, of from 0.35 GPa to 1.0 GPa.

6. A substrate provided with an aromatic polyketone film, comprising:

a substrate; and the aromatic polyketone film according to claim 4 provided on at least a part of a surface of the substrate.

7. An optical element, comprising the substrate provided with an aromatic polyketone film according to claim 6.

8. An image display device, comprising the substrate provided with an aromatic polyketone film according to claim 6.

* * * * *